United States Patent [19]

Turner

[11] Patent Number: 4,861,803
[45] Date of Patent: * Aug. 29, 1989

[54] ORGANIC POLYMERS REINFORCED WITH RIGID ROD MICRO FILLERS

[75] Inventor: Robert B. Turner, Lake Jackson, Tex.

[73] Assignee: The Dow Chemical Company, Midland, Mich.

[ * ] Notice: The portion of the term of this patent subsequent to Oct. 20, 2004 has been disclaimed.

[21] Appl. No.: 109,548

[22] Filed: Oct. 16, 1987

Related U.S. Application Data

[63] Continuation-in-part of Ser. No. 878,451, Jun. 25, 1986, Pat. No. 4,701,745.

[51] Int. Cl.$^4$ .............................................. C08G 18/14
[52] U.S. Cl. ....................................... 521/37; 524/37; 524/41; 525/123; 525/131
[58] Field of Search ....................... 521/37; 524/37, 41; 525/123, 131

[56] References Cited

U.S. PATENT DOCUMENTS 3,872,050 3/1975 Benton et al. .
4,102,831 7/1978 Osgood ................................ 521/99
4,207,407 6/1980 Helminiak et al. .

FOREIGN PATENT DOCUMENTS 56-152830 11/1981 Japan .

OTHER PUBLICATIONS

Sato, "Research Progress in Thermotropic Liquid Crystal Polyurethanes," *Porima Daijesuto*, vol. 37, No. 6, pp. 10–16 (1985).

Jadhav and Kantor, "Liquid Crystqalline Polyurethanes (LCPU): A New Class of Anisotropic Polymers," published at the Gordon Research Conference on Polymer Liquid Crystals on Jul. 7–11, 1986.

Iimura et al., *Makromol. Chem.* 182, p. 2589, (1981).

Tanaka et al., *Polym. Prep Japan*, 33(7), 1647 (1984).

Verbit et al., "Synthesis and Liquid Crystal Properties of Some Urethanes," Mol. Cryst. Liq. Cryst. 1975, vol. 30, pp. 89–99 (1972).

Tanaka et al., "Liquid Crystallinity of Polyurethane Containing Biphenyl Units," *Kobunshi Ronbunshu*, vol. 43, pp 311–314 (1986).

*Primary Examiner*—Maurice J. Welsh

[57] ABSTRACT

In one aspect, this invention is a polyurethane polymer having dispersed therein elongated particles of a high-melting, rigid polymer in an amount sufficient to measurably increase the tensile strength and/or elongation of the polyurethane relative to a like polyurethane which is prepared in the absence of said elongated particles.

In another aspect, this invention is an active hydrogen-containing composition comprising at least one active hydrogen-containing compound having dispersed therein elongated particles of a high-melting rigid polymer in an amount which provides reinforcement to a polyurethane polymer prepared by reacting said active hydrogen-containing composition with a polyisocyanate.

7 Claims, No Drawings

ORGANIC POLYMERS REINFORCED WITH RIGID ROD MICRO FILLERS

CROSS-REFERENCE TO RELATED APPLICATION

This is a continuation-in-part of Ser. No. 878,451, filed June 25, 1986, now U.S. Pat. No. 4,701,745.

BACKGROUND OF THE INVENTION

This invention relates to organic polymers, particularly organic polymers containing dispersed reinforcing agents.

It is well known to reinforce organic polymers with macroscopic fillers such as glass, polyamide, polyester, graphite or similar fibers; particulate fillers such as calcium carbonate, barium sulfate and the like, and other fillers such as sand, and milled or flaked glass. Although these fillers are known to improve the properties of the polymer, they have several drawbacks. One is the amount of such fillers which are needed to obtain good reinforcement.

Typically, up to about 60 percent or more of the filled polymer comprises the filler material. It would be highly desirable to obtain good reinforcement at lower levels of filler. Another problem is that many of these filler materials do not strongly adhere to the polymer matrix. Accordingly, the reinforcement is not as great as would be expected. Another problem is that although certain properties such as modulus and tensile strength are improved by the use of these fillers, these improvements are usually accompanied by a substantial decrease in other properties, notably impact strength, fatigue and elongation.

It is known to reinforce certain types of polymers, notably polyurethanes, with colloidally dispersed polymer particles. These systems are exemplified by the so-called "polymer polyols" used in polyurethane production, which generally contain as the dispersed polymer a styrene/acrylonitrile copolymer, a polyurea polymer or a polyurethane-urea polymer. The dispersed polymers are usually prepared in situ by polymerizing the appropriate monomers within the polyol. The reinforced polyurethane is prepared by reacting the dispersion with a polyisocyanate. The use of polymer polyols has not been found to significantly increase properties such as tensile strength or flexural modulus. The major use for these products has been in flexible polyurethane foams, where the dispersed particles increase the load bearing properties of the foam, and perform a cell opening function.

It is also known to improve the impact properties of thermoplastics such as styrene by dispersing therein minute particles of rubbery substances such as polybutadiene or acrylonitrile/butadiene copolymers. These particles are often grafted to the continuous phase in order to further improve physical properties.

It would be desirable to provide a reinforced polymer in which good reinforcement is obtained even at relatively low filler levels and in which desirable improvements in physical properties are achieved without major losses in other properties.

SUMMARY OF THE INVENTION

In one aspect, this invention is an organic polymer (sometimes referred to herein as a "bulk polymer") having microscopically dispersed therein a high-melting, rigid polymer in an amount sufficient to measurably increase the tensile strength and/or elongation of the bulk polymer relative to a like bulk polymer which is prepared in the absence of said rigid polymer.

Applicants have found that by using a microscopically dispersed rigid polymer as a filler, very substantial improvements in physical properties, particularly tensile properties, can be achieved at surprisingly low loadings of filler material.

DETAILED DESCRIPTION OF THE INVENTION

The filler material employed in this invention is a rigid polymer. The rigid polymer is microscopically dispersed in the bulk polymer. By "microscopically dispersed", it is meant that the polymer is dissolved in the bulk polymer or, preferably, is stably dispersed therein as a plurality of elongated particles having an average length of less than about 10 microns, especially less than about 2 microns, and most preferably less than about 1 micron. By elongated, it is meant that the dispersed particles have an aspect ratio (ratio of length to diameter) of significantly greater than 1. Preferably, the elongated particles have average aspect ratios of greater than about 2.4, more preferably at least about 4, and most preferably at least about 6.4.

The rigid polymer must be of a composition such that it is relatively rigid or forms relatively rigid elongated particles when dispersed in the bulk polymer. By relatively rigid, it is meant that the rigid polymer exhibits a flexural modulus, in bulk, which is at least 1 5 times, preferably at least about 2.5 times greater than that of the bulk polymer. Preferably, the rigid polymer is one which in bulk exhibits a flexural modulus of greater than about 100,000 psi, more preferably greater than about 300,000 psi, most preferably greater than about 500,000 psi.

The rigid polymer is further of a composition such that it is soluble or microscopically dispersible in the bulk polymer as a plurality of elongated particles. If the rigid polymer is not soluble or microscopically dispersible in this manner, it tends to phase out of the bulk polymer, form large, low aspect ratio particles, or be unevenly distributed through the bulk polymer. These conditions tend to minimize the reinforcement obtained from the rigid polymer.

The rigid polymer is also preferably high melting, i.e., has a melting point in excess of 100°, preferably about 150° C. or higher.

Particularly suitable are polymers containing a plurality of aromatic rings which are joined by relatively inflexible or short linkages such as a covalent bond or urea, amide, ester, —C≡C—, —CH$_2$—, —C≡N—, or like groups. Various substantially linear polymers are known to exhibit the required rigidity, and any of those are useful herein.

A particularly useful rigid polymer is a polyurea which is a reaction product of an aromatic diamine and an aromatic diisocyanate. Particularly suitable aromatic diamines are those in which the aromatic ring is para-substituted such as p-phenylene diamine and 4,4'-methylene dianiline. Particularly suitable aromatic diisocyanates are also parasubstituted, such as p-phenylenediisocyanate and 4,4'-diphenylmethanediisocyanate. An especially preferred rigid polymer is the reaction product of 4,4'-methylene dianiline and 4,4'-diphenylmethanediisocyanate.

The rigid polymer is advantageously formed separately from the formation of the bulk organic polymer and then blended therewith in a separate step. Melt blending, solution blending followed by stripping the solvent(s), and other suitable techniques may be employed. In the preparation of polyurethanes and other thermosetting resins, it is preferred that the rigid polymer be added to the one or more of its precursor materials prior to the reaction thereof to form the thermosetting polymer. In preparing polyurethanes, the rigid polymer is preferably dispersed in the active hydrogen-containing composition which is employed to make the polyurethane. In such case, the rigid polymer may be formed in situ in the active hydrogen-containing composition, or component thereof, or can be separately formed and added to the active hydrogen-containing composition.

The rigid polymer can be made by any convenient polymerization technique. Especially suitable is a solution polymerization technique wherein the monomer(s) or polymer precursor(s) are polymerized in a solvent in which the monomers are soluble, and in which the polymer is soluble at least until it has sufficient molecular weight to achieve the desired particle size and aspect ratio. Such solvent may be an active hydrogen-containing compound or mixture thereof if the rigid polymer is to be used in the preparation of polyurethanes, or other, non-isocyanate reactive compound or mixture. For the preferred rigid polyurea polymer, a suitable solvent is dimethylformamide, or a solution thereof containing about 0.5 to about 20%, preferably about 1 to about 5%, by weight of an inorganic salt such as lithium chloride.

Often, the solubility of the rigid polymer in the solvent is a means of controlling its molecular weight. Typically, the polymerization reaction proceeds until the polymer reaches a molecular weight at which it is no longer soluble and precipitates. By the control of temperature, or the use of binary and/or ternary solvent systems, it is often possible to adjust the solvent composition such that the solubility of the polymer therein is such that it precipitates at a desired molecular weight. Other known techniques for controlling polymer molecular weight may similarly be employed in the preparation of the rigid polymer as desired.

In preparing a polyurethane, the rigid polymer is advantageously dispersed into the polyurethane forming components prior to the reaction thereof to form a polyurethane. When the polymer is formed in situ in an active hydrogen-containing compound, no further dispersion is required. However, when the rigid polymer is formed separately, it is dispersed into the polyurethane-forming components in a manner by which the rigid polymer is substantially uniformly distributed. This is readily accomplished by, for example, mixing a solution of the rigid polymer in a suitable solvent with the active hydrogen-containing composition, or component thereof, which may itself by dissolved in the same or a different solvent. After mixing, the solvent is advantageously removed such as by vacuum stripping. Alternatively, the rigid polymer may be added neat or as a melt to the active hydrogen-containing composition. However, this method is less preferred due to the high melting points exhibited by many of the rigid polymers.

Sufficient of the rigid polymer is employed to measurably increase the tensile strength and/or elongation of the bulk polymer. This amount will vary somewhat according to the molecular weight and stiffness of the rigid polymer and the particular bulk polymer used. However, when the rigid polymer has a molecular weight greater than about 3000, about 0.5–30, preferably about 1–25, more preferably about 1–20 parts by weight of rigid polymer per 100 parts of the bulk polymer are suitable. With low molecular weight (less than about 3000 molecular weight) rigid polymers, about 5–30, preferably 5–20 parts by weight rigid polymer typically provide improved properties.

The bulk polymer may be a thermoplastic or thermosetting polymer. Exemplary thermoplastic polymers include the poly(vinyl aromatics) like polystyrene and poly(α-methyl styrene) and copolymers thereof; polyolefins such as low density polyethylene, linear low density polyethylene, very low density polyethylene, high density polyethylene, polypropylene, polybutadiene, and copolymers thereof; copolymers of polyolefins such as ethylene acrylic acid, ethylene methyl acrylate, ethylene ethyl acrylate, ethylene vinyl acetate and ethylene carbon monoxide copolymers; polyvinylhalides and polyvinylidene halides and copolymers thereof; the so-called engineering thermoplastics including high impact polystyrene, ABS resins and polycarbonates; polyetherether ketones; polyesters, including polyethyleneterephthalate and polybutyleneterephthalate; bismaleimides; thermoplastic polyimides; polyphenylene oxide; polyphenylene sulfide; nitrile resins and the like; polystyrene copolymers such as ABS resins, styrene-acrylonitrile resins; styrene-butadiene resins, ASA resins, styrene/maleic anhydride resins and the like; acetal homopolymers; polysulfones; polyarylsulfones, polyethersulfones; cellulosics such as ethyl cellulose, cellulose acetate, cellulose propionate and cellulose butyrate and the like; the diverse fluoroplastics such as PTFE, FEP and the like; nitrile resins; polyamides, including the diverse nylons; poly(phenylene ether) and alloys thereof with styrenic polymers, the diverse acrylic resins; polymethylpentane; polyamide-imide resins; alloys of two or more of the foregoing polymers, and the like, such as are described, for example, on pages 6–100 of Modern Plastics Encyclopedia 1985–1986, McGraw-Hill, Inc., New York 1985, incorporated by reference.

Exemplary thermosetting polymers include polyurethanes, epoxy resins, thermoset polyesters, and the like.

Of the foregoing polymers, the polyolefins, styrenics, engineering thermoplastics, epoxys and polyurethanes are preferred. Polyurethanes are particularly preferred. The preferred polyurethane polymer may be cellular, microcellular or non-cellular. In particular, this invention is useful for making flexible polyurethane foams, rigid polyurethane foams, microcellular or noncellular polyurethane elastomers, structural polyurethane polymers, polyurethane films and coatings, and the like. For the purposes of this invention, the term "polyurethane" refers not only to polymers containing a —NCOO— linkage, but also to other polymers which are based on polyisocyanates, including polyureas, polyurethaneureas, polyisocyanurates, polyurethane-modified polyisocyanurates, and the like. All of these polymers are characterized as being the reaction product of a polyisocyanate with an active hydrogen-containing composition.

An active hydrogen-containing composition is a composition comprising at least one compound having a plurality of moieties which contain at least one hydrogen atom which is reactive with an isocyanate group. Such moieties include hydroxyls, primary and secondary amines, carboxylic acids, mercaptans and the like.

Compounds having hydroxyl and primary or secondary amine groups are preferred. Suitable such compounds are described, for example, in U.S. Pat. No. 4,394,491, incorporated herein by reference.

The molecular weight and functionality of the active hydrogen-containing compound depends on the desired physical characteristics of the polyurethane. For elastomeric applications, cellular and noncellular, a relatively high equivalent weight, e.g. 400–10,000, low functionality (i.e. 2–4 active hydrogen containing groups per molecule) is advantageously used. Often, such elastomers are prepared using a mixture of high equivalent weight compounds and low equivalent weight compounds (crosslinkers or chain extenders). For preparing rigid polyurethane foams, a lower equivalent weight (31–400), high functionality (3–16 functional) active hydrogen containing compound or mixture thereof is generally employed. The selection of suitable active hydrogen containing compounds for prepared a polyurethane of desired characteristics is well known to those skilled in the relevant art.

Particularly suitable active hydrogen containing compounds for the preparation of flexible polyurethane foams are polyester polyols and polyether polyols which contain about 2–3 hydroxyl groups per molecule and have an equivalent weight from about 500–3000. Especially preferred are polyether polyols which are prepared by sequentially reacting propylene oxide and ethylene oxide to a di- or trihydric initiator to form a primary hydroxyl-terminated polyether of about 1000–2000 equivalent weight. Polymer polyols prepared by the in situ polymerization of vinyl monomers, polyurea or polyurethaneurea forming components in said especially preferred polyols are also particularly suitable. In making flexible polyurethane foams, it is common practice to employ a minor amount of a crosslinker such as diethanolamine in the active hydrogen-containing composition.

In making noncellular or microcellular polyurethane elastomers, particularly suitable active hydrogen containing compounds are polyester polyols and polyether polyols which contain about 2–3 hydroxyl groups per molecule and have an equivalent weight from about 500–3000. Especially preferred are polyether polyols which are prepared by sequentially reacting propylene oxide and ethylene oxide to a di- or trihydric initiator to form a primary hydroxyl-terminated polyether of about 1000–2000 equivalent weight Such relatively high equivalent weight polyol is normally used in conjunction with a difunctional, relatively low equivalent weight active hydrogen containing compound such as are described in U.S. Pat. No. 4,269,945. It is often desirable to prereact all or part of either the high equivalent weight compound or the low equivalent weight polyol with a polyisocyanate to form an isocyanate terminated prepolymer or quasi-prepolymer prior to the reaction of the prepolymer with the remainder of the active hydrogen-containing materials. Either conventional casting or reaction injection molding (RIM) techniques may by used to mold the elastomer. Such RIM techniques are described, for example, in Sweeney, F. M., Introduction to Reaction Injection Molding, Technomics, Inc., 1979, and in U.S. Pat. Nos. 4,269,945, 4,297,444, 4,530,444, and 4,530,941, all incorporated by reference.

The polyisocyanate employed to make the polyurethane is an organic compound having averages of at least two isocyanate groups per molecule. The isocyanate groups may be bonded to aromatic or aliphatic carbon atoms. Such polyisocyanates are described, for example, in U.S. Pat. Nos. 4,065,410, 3,401,180, 3,454,606, 3,152,162, 3,492,330, 3,001,973, 3,594,164 and 3,164,605, all incorporated by reference.

Aromatic polyisocyanates which are particularly useful include 2,4- and/or 2,6-toluene diisocyanate, diphenylmethanediisocyanate, p-phenylene diisocyanate, polymethylenepolyphenylpolyisocyanates, mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

In addition, prepolymers and quasi-prepolymers of the foregoing polyisocyanates having an -NCO content of about 0.5 to about 30% by weight are useful herein.

The polyisocyanate is advantageously present in a amount sufficient to provide in the reaction mixture from about 70 to about 500, preferably about 80 to about 150, and more preferably about 95 to about 120 isocyanate groups per 100 active hydrogen-containing groups. Higher amounts of the polyisocyanate can be used when the formation of an isocyanurate-containing polymer is desired.

In addition to the polyisocyanate and active hydrogen-containing compounds, various other additives which are useful in the preparation of polyurethane polymers may be used herein. Such additives include catalysts, blowing agents, surfactants, fillers, pigments, antioxidants, internal mold release agents and the like.

Suitable blowing agents for preparing cellular polyurethanes include water, low boiling halogenated alkanes such as methylene chloride, monochlorodifluoromethane, dichlorodifluoromethane, dichloromonofluoromethane and the like, the so-called "azo" blowing agents, finely divided solids, and the like as well as other materials which generate a gas under the conditions of the foaming reaction. Water, the halogenated methanes or mixtures thereof are preferred. Water is advantageously employed in an amount from about 0.5 to about 10, preferably about 1 to about 5 parts per 100 parts by weight of the active hydrogen containing compounds. The halogenated alkanes are advantageously used in amounts from about 5 to about 75 parts per 100 parts of active hydrogen containing compounds.

Surfactants are commonly used in the production of cellular polyurethanes, in an amount sufficient to stabilize the forming cells against collapse until the foam is cured. Silicone surfactants are preferred.

Catalysts for preparing polyurethanes include organometallic catalysts and tertiary amines compounds. Of the organometallic catalysts, organotin catalysts are generally preferred. Suitable catalysts are described, for example, in U.S. Pat. No. 4,495,081, incorporated herein by reference. When using such catalysts, an amount sufficient to increase the rate of the reaction of the polyisocyanate and active hydrogen-containing compounds is employed. Typically, about 0.001 to about 0.5 parts of an organometallic catalyst is used per 100 parts of active hydrogen-containing compound. Tertiary amine-containing compounds are advantageously used in amounts ranging from about 0.1 to about 3 parts per 100 parts of active hydrogen containing compounds.

Suitable macroscopic fillers include barium sulfate, titanium dioxide, carbon black, iron oxide, calcium carbonate, clays such as kaolin and wollastinite, fibers such as glass, polyester and polyamide fibers, and the like. However, due to the reinforcing behavior of the rigid polymer, the need to employ macroscopic fillers for the purpose of reinforcement is eliminated or significantly reduced.

Suitable internal mold release agents include those described in U.S. Pat. No. 4,585,803, incorporated herein by reference, as well as combinations of metal carboxylates, particularly zinc carboxylates, with primary or secondary amine-containing compounds, especially amine-terminated polyethers, optionally in the presence of a free acid.

The polymer of this invention is useful in preparing a large variety of molded and shaped articles The polyurethane polymer of this invention is useful as cushioning for furniture, bedding, automobile seating and the like; as a coating or sealant; as automobile parts such as bumpers, door panels, fascia and the like, as well as for other uses.

The following examples are provided to illustrate the invention, but are not intended to limit the scope thereof. All parts and percentages are by weight unless otherwise indicated.

EXAMPLE 1

A. Preparation of Rigid Rod Polymer

In a suitable flask are dissolved 19.9 grams of methylene dianiline (MDA) and 25 grams diphenylmethanediisocyanate (MDI) in 750 grams of dimethylformamide (DMF). The solution is placed under a nitrogen atmosphere and stirred for 30 minutes at room temperature. At this time, an off-white polymer precipitates out of the solution. Seven grams of lithium chloride are added to the solution to redissolve the polymer. After sitting for one hour, a few drops of methyl alcohol are added to react with any terminal -NCO groups. Infrared analysis indicates that no measurable isocyanate groups remain. Differential scanning calorimetry (DSC) indicates that the polymer has the average structure

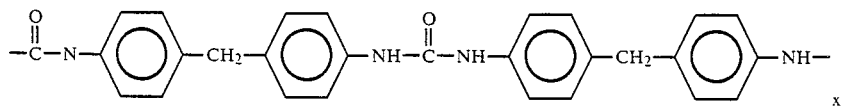

B. Preparation of Polyurethane Elastomers

Into 675 grams of DMF are placed 25 grams of a 2000 molecular weight difunctional poly(propylene oxide) and 23.6 grams of a 143 equivalent weight "liquid" diphenylmethanediisocyanate. This mixture is heated at 70° C. with stirring for two hours under a nitrogen atmosphere. Then, 5 grams of 1,4-butanediol are added and allowed to react for an additional two hours at 70° C.

C. Reinforced Polymer Film Preparation

A series of polyurethane films (Sample Nos. 1-5 and Comparative Sample No. A) are prepared by blending portions of the polyurethane elastomer solution and the rigid rod polymer solution to yield polyurethane solutions containing 0, 3, 6, 10, 15, 20 and 30% (by weight of the polyurethane) of rigid rod polymer. Comparative Sample No. A contains none of the rigid rod polymer and comparative Sample No. B contains 3% of the rigid rod polymer. In each instance, a 20 gram portion of the mixture is poured into a polyethylene container and the solvents are evaporated overnight at 50° C. The residue in each instance is a thin film which is easily removed from the container. The films are tested for tensile strength and elongation according to ASTM D-412. The results are as reported in Table 1 following.

TABLE 1

| Sample No. | % Rigid Polymer | Tensile Strength, psi | Elongation % |
| --- | --- | --- | --- |
| A* | 0 | 1091 | 276 |
| B* | 3 | 556 | 181 |
| 1 | 6 | 1500 | 86 |
| 2 | 10 | 2750 | 305 |
| 3 | 15 | 3333 | 178 |
| 4 | 20 | 2200 | 131 |
| 5 | 30 | 1167 | 55 |

*Not an example of this invention

As can be seen from the data in Table 1, the inclusion of about 6-30 percent of the low molecular weight rigid rod polymer causes substantial increases in tensile strength and, in some cases, an improvement in elongation as well. This is particularly seen when about 6-20 percent rigid polymer is present. In Sample No. 3, tensile strength is tripled with only a small loss in elongation, and in Sample No 2, tensile strength is increased over 250% and elongation is increased. This behavior is contrary to the normal activity of reinforcing agents, which tend to greatly decrease elongation while increasing tensile strength. In Sample B, the inclusion of 3% of the rigid rod polymer decreases both tensile strength and elongation. This is believed due to the relatively low molecular weight of the rigid rod polymer. At this low molecular weight and low level of use, the rigid rod polymer is believed to plasticize rather than reinforce the polymer.

EXAMPLE 2

A Preparation of Polyurethane Elastomer

Into 700 grams dimethylformamide are dissolved 25 grams of the polyol described in Part B of Example 1, 23.6 grams of a 143 equivalent weight liquid MDI and 5 grams of 1,4-butanediol. This solution is heated at 60° C. under a nitrogen pad for 6 hours.

B. Preparation of Reinforced Polyurethane Films

A series of polyurethane films (Comparative Sample No. C and Sample Nos. 6-11) are prepared by blending portions of the polyurethane elastomer solution described in Part A of this example with portions of the rigid rod polymer solution described in Example 1 to yield polyurethane solutions containing 0, 3, 6, 10, 15, 20 and 30% rigid rod polymer (based on weight of polyurethane). Films are cast by placing small quantities of the solutions in Mylar boats, heating to 50° C. overnight and then heating at 100° C. for 3 hours. The properties of these films are tested as described in Example 1, with results as reported in Table 2.

TABLE 2

| Sample No. | % Rigid Polymer | Tensile Strength, psi | Elongation % |
|---|---|---|---|
| C* | 0 | 1732 | 127 |
| 6 | 3 | 1606 | 236 |
| 7 | 6 | 2794 | 162 |
| 8 | 10 | 3075 | 263 |
| 9 | 15 | 2121 | 174 |
| 10 | 20 | 2408 | 142 |
| 11 | 30 | 1041 | 73 |

*Not an example of this invention

In this polyurethane, addition of even 3% rigid rod polymer almost doubles elongation at substantially the same tensile strength. At 6–20% levels of rigid rod polymer, very substantial increases in both tensile strength and elongation are seen.

EXAMPLE 3

A. Preparation of Rigid Rod Polymer

An MDI-MDA copolymer is prepared as described in Example 1, except this time the polymerization solvent contains 7 grams lithium chloride. No precipitation occurs after one hour of polymerization at which time a small amount of methyl alcohol is added to terminate the reaction. The resulting solution is significantly more viscous than that described in Example 1, indicating that the rigid polymer has a substantially higher molecular weight.

B. Preparation of Polyurethane Elastomer

A polymer solution is prepared as described in Example 2-A, except that pure MDI is used, and the reaction is conducted for 8 hours.

C. Preparation of Reinforced Polyurethane Films

Polyurethane films (Sample Nos. 12-15 and comparative Sample No. D) are prepared as described in Example 1-C, except that a Mylar boat is used to cast the films. Films having 0, 1, 3, 6, and 10% rigid rod reinforcement (based on weight of polyurethane) are prepared which are tested as described in Example 1. Tensile modulus and the thermal expansion in inches which results from heating the films from 50° C. to 150° C. are also evaluated. Results are as reported in Table 3.

TABLE 3

| Sample No. | C* | 12 | 13 | 14 | 15 |
|---|---|---|---|---|---|
| % Rigid Rod Polymer | 0 | 1 | 3 | 6 | 10 |
| Tensile Str., psi | 520 | 1715 | 1810 | 1914 | 942 |
| Elongation, % | 133 | 310 | 300 | 279 | 30 |
| Tensile Mod., psi | 1667 | 6322 | 8089 | 1047 | 6977 |
| Extension (50–150° C., in.) | .0039 | 0.138 | .0052 | .0041 | .0016 |

In this example, use of a higher molecular weight rigid rod polymer provides over 300% increase in tensile strength and over 250% increase in elongation at levels as low as 1%. Tensile module are also increased in all cases except Sample No. 14. Microscopic analysis of Sample Nos. 12-15 show the presence of microscopically dispersed polyurea particles measuring about 1 micron in length and 0.1 micron in diameter.

COMPARATIVE EXAMPLE

A polyurethane solution is prepared as described in Example 3. To separate portions of this solution are added sufficient amounts of 1/16" milled glass fibers to yield polyurethanes containing 0, 3, 6, 10, 15, and 20% glass (based on weight of polyurethane). Films are made from these solutions as described in Example 2 and tested as described in Example 1, with results as reported in Table 4.

TABLE 4

| % Glass | Tensile Strength, psi | Elongation % |
|---|---|---|
| 0 | 1220 | 276 |
| 3 | 1403 | 233 |
| 6 | 1040 | 107 |
| 10 | 1092 | 80 |
| 15 | 1303 | 33 |
| 20 | 1618 | 30 |

These results show the typical effect of using macroscopic inorganic fillers to increase tensile strength. Although tensile strength is in some cases increased, the use of the glass fibers uniformly causes a substantial loss in elongation, which increases with increasing level of filler. This result is in direct contrast with the present invention, in which elongation is substantially maintained, and often greatly increased with the use of rigid rod polymers as reinforcing agents.

What is claimed is:

1. An organic bulk polymer having microscopically dispersed therein a high-melting, rigid polymer in an amount sufficient to measurably increase the tensile strength and/or elongation of the bulk polymer relative to a like bulk polymer which does not contain said rigid polymer.

2. The polymer of claim 1 wherein said bulk polymer is a thermosetting polymer.

3. The polymer of claim 1 wherein said bulk polymer is a thermoplastic polymer.

4. The polymer of claim 1 wherein said rigid polymer is dispersed in the bulk polymer as a plurality of particles having an aspect ratio of at least about 6.4.

5. The polymer of claim 4 which contains about 1 to about 20 parts of rigid polymer per part of bulk polymer.

6. The polymer of claim 5 wherein said rigid polymer comprises a polymer of an aromatic diamine and an aromatic diisocyanate.

7. The polymer of claim 6 wherein said aromatic diamine comprises methylene dianiline and said aromatic diisocyanate comprises diphenylmethanediisocyanate.

* * * * *